(No Model.) 2 Sheets—Sheet 1.

C. L. COFFIN.
APPARATUS FOR ELECTRICALLY HEATING OR WORKING METALS.

No. 515,652. Patented Feb. 27, 1894.

Witnesses:

INVENTOR
Charles L. Coffin (No Model.) 2 Sheets—Sheet 2.

C. L. COFFIN.
APPARATUS FOR ELECTRICALLY HEATING OR WORKING METALS.

No. 515,652. Patented Feb. 27, 1894.

WITNESSES

INVENTOR
Charles L. Coffin.

UNITED STATES PATENT OFFICE.

CHARLES L. COFFIN, OF DETROIT, MICHIGAN.

APPARATUS FOR ELECTRICALLY HEATING OR WORKING METALS.

SPECIFICATION forming part of Letters Patent No. 515,652, dated February 27, 1894.

Application filed February 9, 1893. Serial No. 461,621. (No model.)

*To all whom it may concern:*

Be it known that I, CHARLES L. COFFIN, of Detroit, in the county of Wayne and State of Michigan, have invented a new and useful Improvement in Apparatus for Electrically Heating or Working Metal, of which the following is a specification.

My invention consists in a method of and apparatus for electrically heating metal or working metal, hereinafter fully described and claimed.

Figure 1:
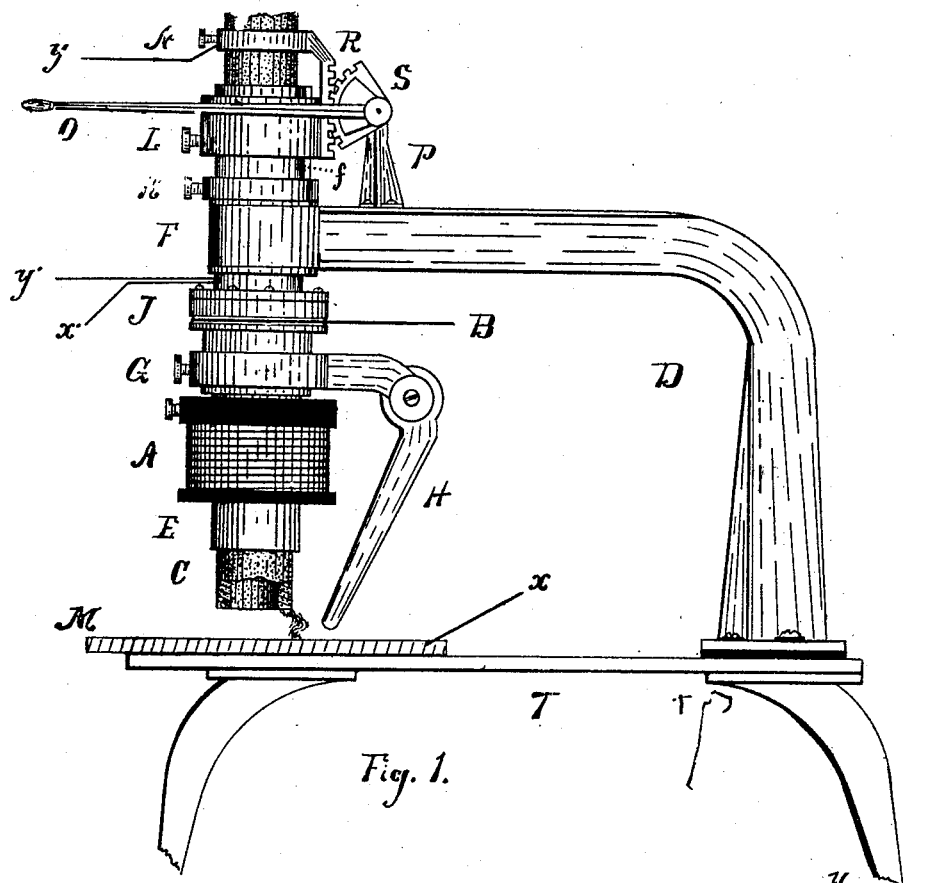
Figures 2, 3:
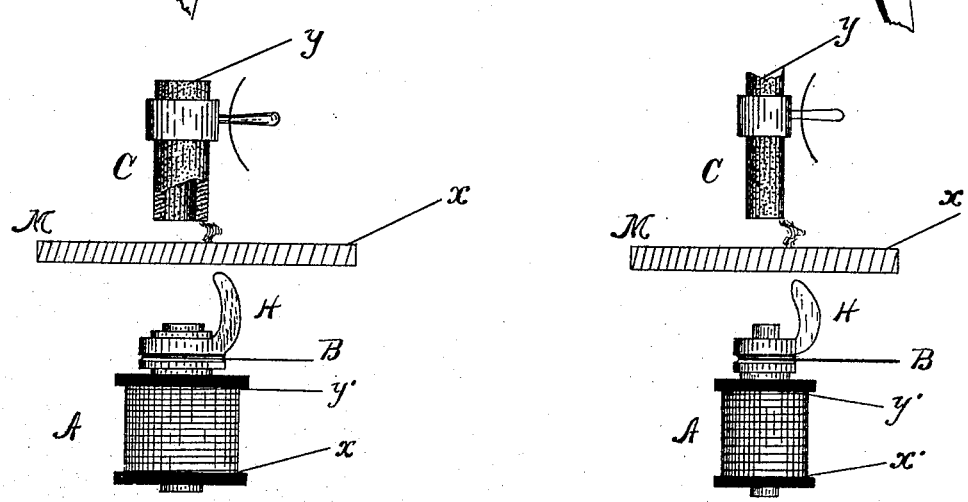
Figure 4:
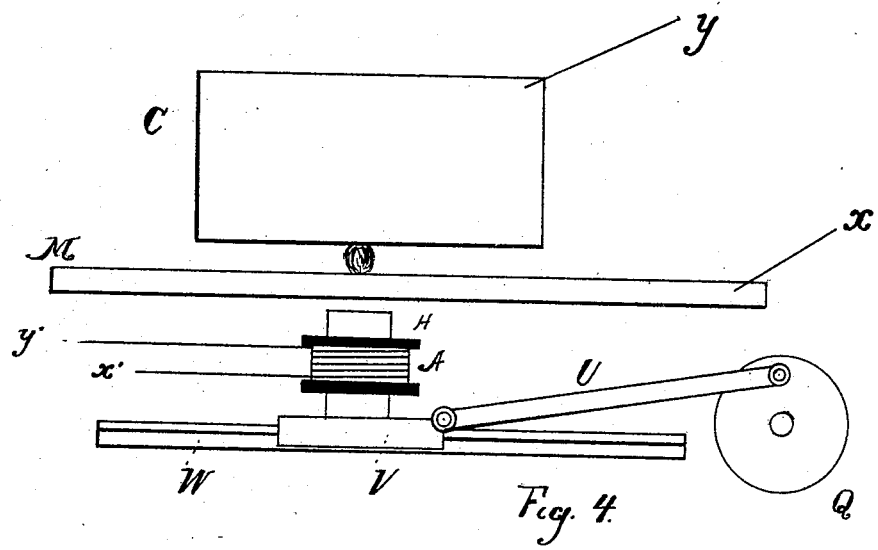
Figure 5:
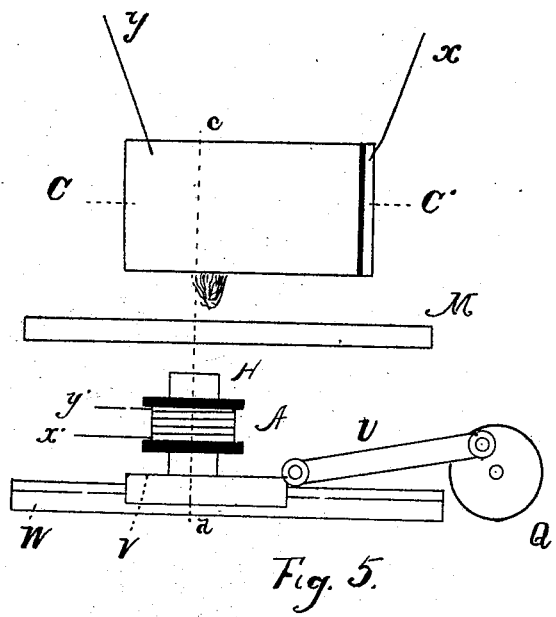
Figure 6:
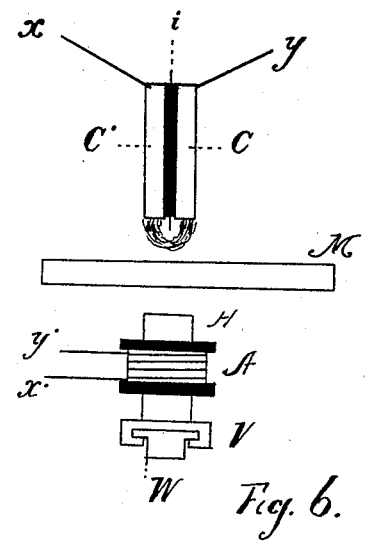

Figure 1 is a side elevation with the lower end of the carbon partly in section. Figs. 2 and 3 are diagrammatic views showing the magnet located beneath the material. Fig. 4 is a side elevation of the modified apparatus. Fig. 5 is a side view of Fig. 6, and Fig. 6 is an end view of a modified apparatus somewhat like that shown in Fig. 4.

In Fig. 1, T represents a supporting table, and M represents a metal plate to be heated or worked, lying on said table.

D represents a goose-neck or support to carry the carbon and working mechanism above the material to be heated.

F represents a collar on the end of goose-neck D, to fit the metallic core E of an electro-magnet A, said core E being feathered or splined into collar F, as shown by the spline *f*, to prevent its rotation, and being supported at any desired position by a set screw K passing through collar F.

L represents a collar fitted to slide on core E and having an upward extension R, provided with teeth; and a collar N provided with a set screw to grasp the carbon C which lies within the core E.

S represents a toothed segment pivoted in the bracket P carried on goose-neck D, and provided with a lever O, by means of which the collar N and with it the carbon C may be raised or lowered at will.

J represents a loose iron collar encircling core E, and adapted to rotate thereon, the surface of which is, either as a whole, adapted to receive a belt, or may be provided with a groove B for that purpose.

G represents an iron collar clamped in collar J by a set screw, and having a projecting arm to which is connected an arm H of magnetic material, which I preferably make adjustable, as shown in Fig. 1, the arm H therefore forming one pole of the core E of the electro-magnet A, and this pole may be brought in close proximity to the lower end of carbon C. In the arrangement shown in Fig. 1, material M is connected with one terminal of an electric generator by a conductor *x*, and then carbon C is connected with the other terminal of said generator by a conductor *y*.

*y'*, *y'*, represent conductors by which the bobbin of electro-magnet A is connected with the terminals of a generator of electricity either directly or in shunt circuit with conductors *x* and *y*.

The operation of this device is as follows: The parts being in the position shown in Fig. 1, an electric current being passed through conductors *x* and *y*, material M and carbon C, by lowering the carbon into contact with material M and then raising it, a voltaic arc will be formed between said carbon and the material as indicated in the figure. A current also passing through electro-magnet A, magnetizes the core E, and arm H. Now by rotating the collar J and with it the arm H of the core, said arm travels round and round said carbon C, and according to its polarity either attracts or repels the voltaic arc, which travels round and round either following or receding from arm H, thus causing said arc to affect a much larger portion of the material M than is due simply to its normal size.

In Figs. 2 and 3 the arrangement of parts in Fig. 1 is modified by putting the electro-magnet A beneath the material M, in which position it will attract or repel the arc and cause it to follow pole H of said electro-magnet when said pole is rotated.

In the diagram of Fig. 4, the carbon C instead of being a rod is a plate connected by conductor *y* with one terminal of a generator of electricity, the material M being connected by the conductor *x* with the other terminal. In this modification the pole H of magnet A does not rotate but the magnet is reciprocated along a way W by being mounted on a carriage V fitted to traverse said way and reciprocated thereon by means of a crank Q and pitman U.

In Figs. 5 and 6, two carbons C and C' are used insulated from each other by insulation (the carbon C' being elongated a little in Fig. 5 to make it visible) and the magnet A with its pole H is reciprocated in the same manner and by the same mechanism as that above described for Fig. 4. In Figs. 5 and 6 however, the material M is not in circuit, the arc being sprung between the two conductors C and C', which are connected with the terminals of a generator by means of the conductors $x$ and $y$. I find that by this method the efficiency of a voltaic arc may be greatly increased as applied to practical work, for it is not permitted to concentrate its heat upon one point, but is rapidly moved from one point to another, whereby an arc of greater power may be used than if it is stationary, and a correspondingly greater effect produced.

What I claim as my invention, and desire to secure by Letters Patent, is—

1. An electric arc metal working apparatus comprising electrodes for the passage of current and an arc-disturber with mechanism for changing its relation to the electrodes during work.

2. The combination in an apparatus for working metals by an electric arc, of an electrode forming one terminal, a work piece or pieces, forming the other terminal, and means such as a moving magnetic field for automatically shifting the arc into continuously varying positions with relation to the electrodes so as to diffuse its action, or extend the area of its action on the work.

3. In an apparatus for electric heating and metal working, the combination with the material, an electrode means for maintaining a voltaic arc between said material and electrode, of a movable magnetic pole and means for giving motion to the same, substantially as shown and described.

4. In an apparatus for electrically heating metal the combination of a support for the material to be heated, a support for an electrode, means for maintaining a voltaic arc in proximity to said material, an electro-magnet having its pole in proximity to said voltaic arc, and means for moving said magnetic pole, substantially as and for the purposes set forth.

5. In an apparatus for electrically heating metal, the combination of mechanism for producing a voltaic arc, an electro-magnet carried on a movable support in proximity to said arc, and means for moving said magnet with relation to the arc, substantially as and for the purpose set forth.

6. In an apparatus for electrically heating metal, the combination of mechanism for producing a voltaic arc, a magnet carried on a movable support in proximity to said arc, and means for moving said magnet, with relation to the arc substantially as and for the purposes set forth.

CHARLES L. COFFIN.

Witnesses:
CYRUS E. LOTHROP,
GERTRUDE H. ANDERSON.